R. J. MITCHELL.
AUTOMATIC AIR BRAKE COUPLING.
APPLICATION FILED JULY 15, 1911.
1,017,442.
Patented Feb. 13, 1912.
3 SHEETS—SHEET 1.
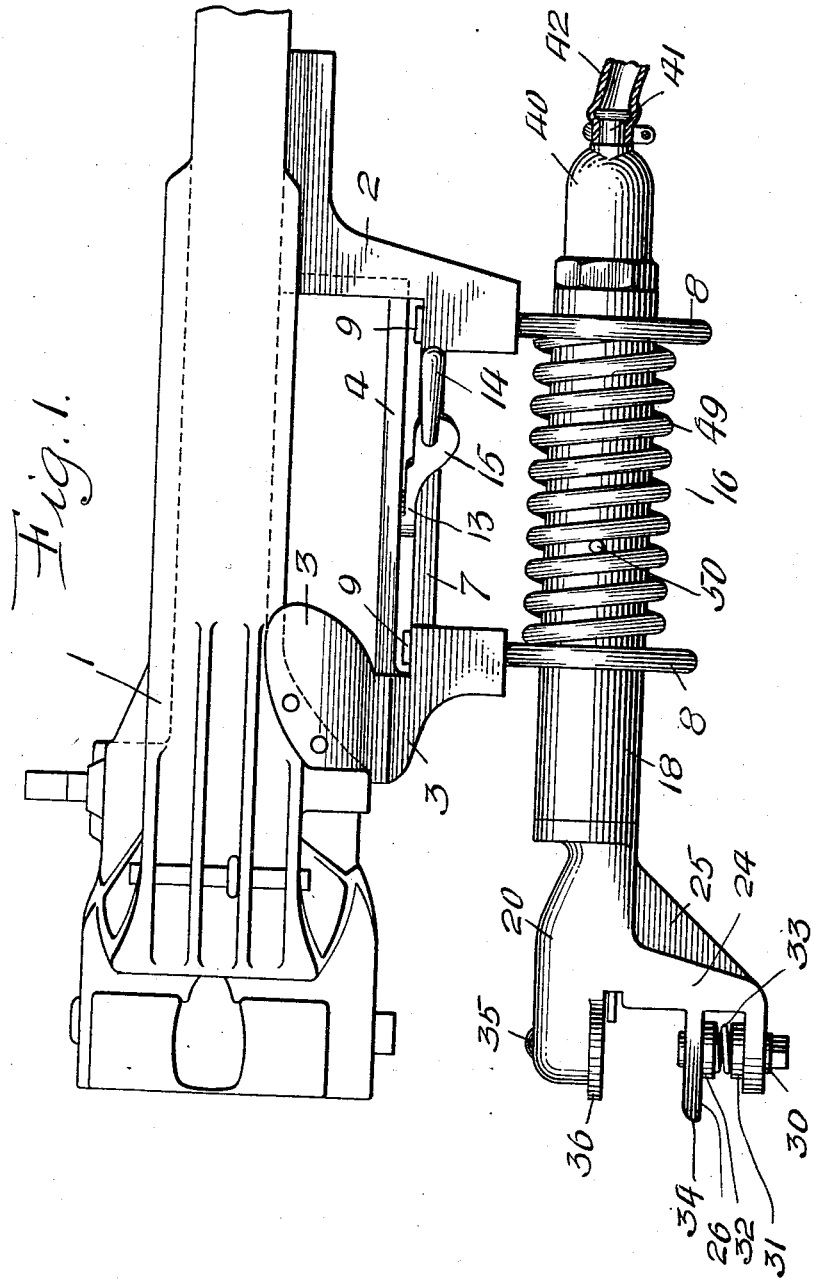
WITNESSES:
INVENTOR.
R. J. Mitchell
BY
ATTORNEYS.

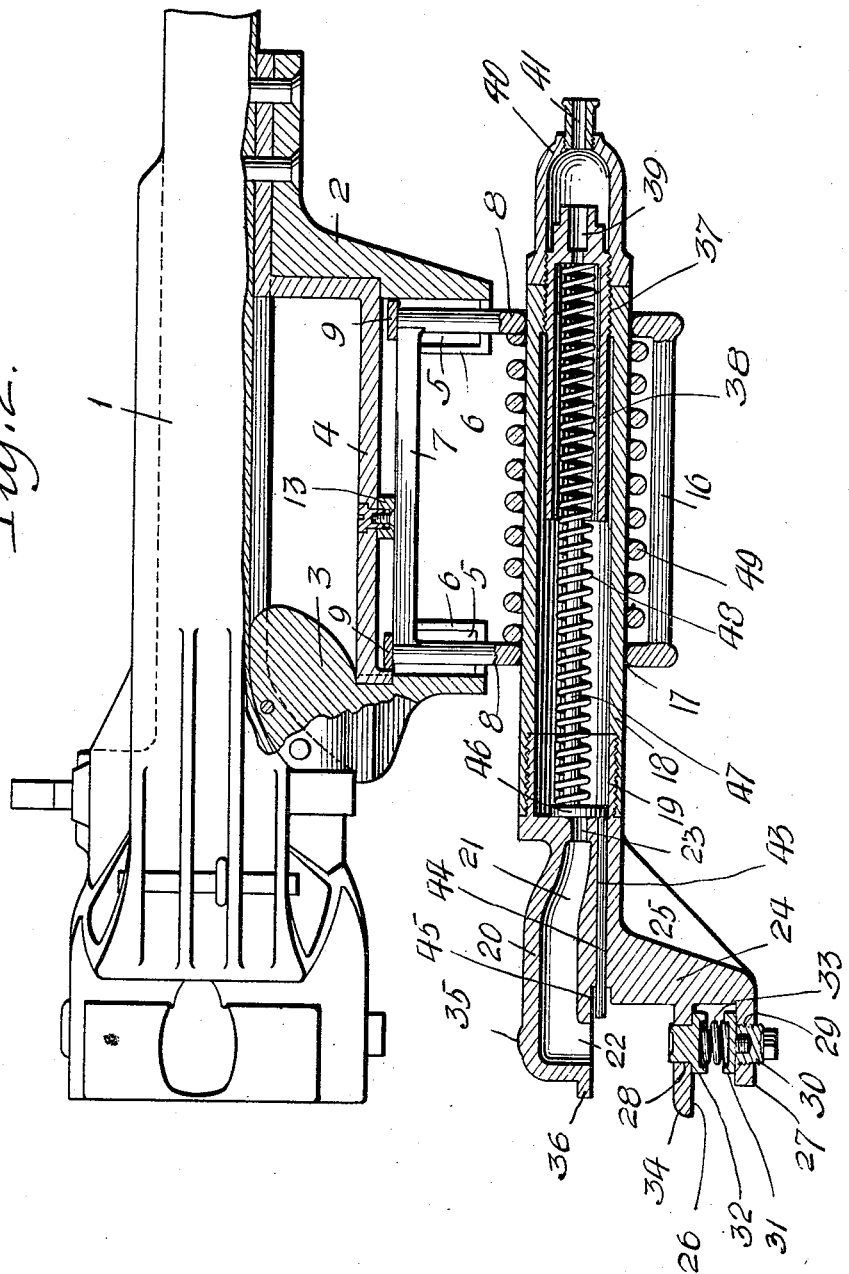

R. J. MITCHELL.
AUTOMATIC AIR BRAKE COUPLING.
APPLICATION FILED JULY 15, 1911.
1,017,442.
Patented Feb. 13, 1912.
3 SHEETS—SHEET 3.
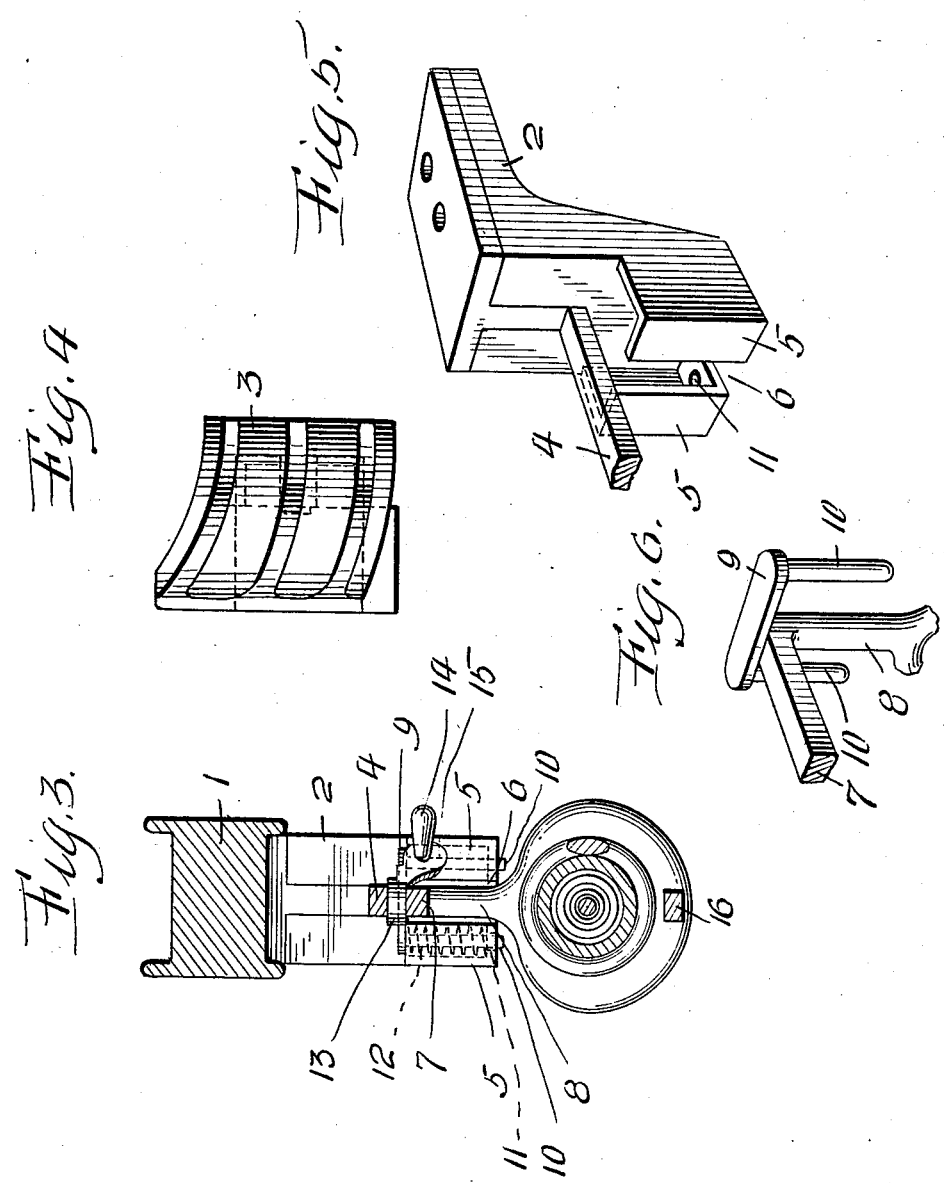
WITNESSES:
INVENTOR.
BY R. J. Mitchell.
ATTORNEYS.

UNITED STATES PATENT OFFICE.

ROBERT J. MITCHELL, OF MARION, OHIO.

AUTOMATIC AIR-BRAKE COUPLING.

1,017,442. Specification of Letters Patent. Patented Feb. 13, 1912.

Application filed July 15, 1911. Serial No. 638,638.

*To all whom it may concern:*

Be it known that I, ROBERT J. MITCHELL, a citizen of the United States of America, residing at Marion, in the county of Marion and State of Ohio, have invented certain new and useful Improvements in Automatic Air-Brake Couplings, of which the following is a specification, reference being had therein to the accompanying drawing.

This invention relates to automatic air brake couplings, and the primary object of my invention is the provision of positive and reliable means, in a manner as will be herein set forth, for automatically connecting the train line pipes of two cars, thereby obviating the necessity of using hose couplings, a train-man going between two cars to couple the train lines, and avoid all danger of disconnection under ordinary working conditions.

A further object of this invention is to provide an air-brake coupling that will readily adjust itself during the coupling of cars, the coupling being equipped with a draft compliance for the vibrations and movements set up during the coupling operation and the movement of a train.

With the above and other objects in view, the invention resides in the novel construction, combination, and arrangement of parts to be hereinafter specifically described and then claimed.

Reference will now be had to the drawings, wherein there is illustrated a preferred embodiment of the invention, but it is to be understood that the structural elements are susceptible to such changes in size, shape and proportions as fall within the scope of the appended claims.

In the drawings: Figure 1 is a side elevation of the coupling; Fig. 2 is a longitudinal sectional view of the same; Fig. 3 is a cross sectional view of the coupling; Fig. 4 is a plan of a detached bearing; Fig. 5 is a perspective view of another detached bearing, and Fig. 6 is a perspective view of a portion of a hanger.

The reference numeral 1 denotes a car coupler of the ordinary and well known type, the Tower automatic coupler, and suitably attached to the bottom of said coupler are bearings 2 and 3. The bearing 3, as shown in Fig. 4 of the drawings, is especially designed to fit the under side of the coupler and this bearing is braced by longitudinal frame 4 connected to the coupler simultaneously with the means employed for connecting the bearing 2. The bearings 2 and 3 have lower confronting sides thereof provided with boxes 5, slotted as at 6, to provide clearance for connecting bar 7 of two hangers 8. The upper ends of the hangers 8 have cross heads 9 provided with depending pins 10. These pins extend to openings 11 in the bottom of each box and are encircled by compression springs 12.

Pivotally connected to the under side of the frame 4 is a lever 13, having a handle 14 and a cam surface 15 adapted to ride into engagement with the upper surface of the bar 7 and depress said bar to correctly position the hangers 8, as will hereinafter appear.

The lower ends of the hangers 8 are connected by a longitudinal bar 16 and said hangers have longitudinal alining opening 17 for barrel or tubular body 18 of the coupling. The forward end of the body 18 is screw-threaded to receive the nipple 19 of a coupling head 20. The head 20 has a longitudinal port 21 formed therein, the forward end of the port terminating in the inner side of the head, as at 22, and the rear end of the port terminating in a small opening 23 in communication with the body 18.

The head 20 has the inner side thereof provided with an offset portion 24, reinforced by a web or rib 25. The offset portion 24 has two forwardly extending projections 26 and 27 arranged in parallelism with the projection 26 confronting the inner side of the head 20. These projections have alining openings 28 and 29 with the walls of the opening 29 screw-threaded to receive a plug 30 to which is detachably connected a socket member 31 coöperating with a similar member 32 movably mounted in the opening 28. Interposed between the members 31 and 32 is a coiled compression spring 33. The end of the member 26 is beveled, as at 34, to facilitate another coupling head entering or engaging the head 20, the other coupling head being identical in construction to that just described. The head has the outer side thereof provided with a button or enlargement 35, adapted to be engaged by the member 32 to assist in retaining the heads together, and the head has a forwardly projecting flange 36 for a purpose that will presently appear. The rear end of the body 18 has the inner walls thereof screw-threaded, as at 37, to receive a tubular housing 38, said housing having the forward end thereof completely open and the rear end thereof partially closed, with the exception of an opening 39. Screwed upon the protruding end of the housing 38 is a hollow cap 40 provided with a nipple 41 adapted to be connected by a hose or otherwise flexibly connected to a train line pipe (not shown).

Slidably mounted in a longitudinal opening 43, provided therefor in the head 20, is an actuating valve stem 44, having the forward end thereof extending into a recess 45, adapted to receive the flange 36 of another coupling head. The rear end of the valve stem 44 is provided with a valve 46 adapted to normally close the opening 23 of the head 20, and said valve has a rod 47 extending longitudinally of the nipple 19 and the body 18. Encircling said rod, between the valve 46 and the rear end of the housing 38, is a coiled compression spring 48, a portion of which is surrounded by the housing 38; between the hangers 8 is a large spring 49, and extending between two of the convolutions of said spring is a pin 50, carried by the body 18. The spring 49 is employed to cushion a movement of the body 18 and normally maintain said body in the hangers 8.

When two cars are placed together, the coupling heads 20 readily interlock and the flanges 36 actuate the stems 44 to open the valves 46 and thereby establish communication between the train lines through the medium of the elements 20, 18, 38, 40, 41, and 42.

Should there be any inequality between the tension of the set of springs 12 of one coupling and another coupling, the lever 13 of either coupling can be moved, whereby the hangers will be raised or lowered to permit of the coupling heads 20 interlocking. This vertical adjustment of the couplings is only necessary when the tension of the springs 12 is impaired by long use.

The tubular bodies carried by the opposing ends of the cars are oppositely disposed with respect to each other, that is to say, one is inverted with respect to the other whereby the two heads can be coupled together when occasion so requires.

What I claim is:—

1. In an automatic air brake coupling, brackets, hangers movably supported by said brackets, a tubular body movably mounted on said hangers, a coupling head carried by said body and in communication therewith, a normally closed valve arranged in said body, a stem carried by said valve and extending to said coupling head adapted to be actuated by another coupling head to open said valve, and means, including a cam lever carried by said brackets and adapted to adjust said hangers to correctly position said coupling head.

2. In an automatic air brake coupling, brackets, hangers movably supported by said brackets, a tubular body movably supported by said hangers, a coupling head carried by said body and in communication therewith, a valve adapted to control the communication between said head and said body, means arranged in said body and adapted to normally maintain said valve closed, means arranged in said coupling head and adapted to be actuated by another head to open said valve, means including socket members carried by said coupling head and adapted to maintain another head in engagement therewith, and means encircling said body and adapted to normally maintain said body in the forward position.

3. In an automatic air brake coupling, brackets capable of being suspended from a car, hangers movably supported by said bracket, a tubular body movably mounted in said hangers and communicating with a train pipe, a coupling head carried by said body and in communication therewith, a valve for controlling communication between said head and body and provided with a stem projecting in said coupling head and capable of being shifted and maintained in shifted position by an opposing coupling head, thereby establishing communication between its respective tubular body and coupling head, and means carried by said bracket for adjusting the hanger to operative position with respect to said first mentioned coupling head.

4. In an automatic air brake coupling, brackets capable of being suspended from a car, hangers movably supported by said bracket, a tubular body movably mounted in said hangers and communicating with a train pipe, a coupling head carried by said body and in communication therewith, a valve for controlling communication between said head and body and provided with a stem projecting in said coupling head and capable of being shifted and maintained in shifted position by an opposing coupling head, thereby establishing communication between its respective tubular body and coupling head, means carried by said bracket for adjusting the hanger to operative position with respect to said first mentioned coupling head, and means for normally maintaining said body in engagement with said hangers.

In testimony whereof I affix my signature in the presence of two witnesses.

ROBERT J. MITCHELL.

Witnesses:
 Jos. E. Grundy,
 Charles L. Justice.

Copies of this patent may be obtained for five cents each, by addressing the "Commissioner of Patents, Washington, D. C."